United States Patent [19]

Kawashima

[11] Patent Number: 4,663,509
[45] Date of Patent: May 5, 1987

[54] APPARATUS FOR INSERTION OF ELECTRODE WIRE IN THE WIRE CONDUIT OF A LOWER ARM

[75] Inventor: Yoshihiro Kawashima, Nagoya, Japan

[73] Assignee: Brother Kogyo Kabushiki Kaisha, Japan

[21] Appl. No.: 705,518

[22] Filed: Feb. 26, 1985

[30] Foreign Application Priority Data

Mar. 6, 1984 [JP] Japan .................................. 59-42459

[51] Int. Cl.$^4$ ............................................. B23H 7/10
[52] U.S. Cl. .................................. 219/69 W; 204/206
[58] Field of Search ............... 219/69 W, 69 E, 69 M, 219/68, 69 R; 204/206

[56] References Cited

U.S. PATENT DOCUMENTS

| | | | |
|---|---|---|---|
| 3,822,374 | 7/1974 | Ullmann et al. | 219/69 W |
| 4,383,161 | 5/1983 | Corcelle | 219/69 W |
| 4,403,129 | 9/1983 | Baker | 219/69 R |
| 4,521,661 | 6/1985 | Inoue | 219/69 W |

FOREIGN PATENT DOCUMENTS

| | | | |
|---|---|---|---|
| 2503059 | 7/1975 | Fed. Rep. of Germany | 219/69 E |
| 139833 | 10/1981 | Japan | 219/68 |
| 114819 | 7/1983 | Japan | 219/69 E |
| 59-14428 | 1/1984 | Japan | 219/69 W |

Primary Examiner—A. D. Pellinen
Assistant Examiner—Geoffrey S. Evans
Attorney, Agent, or Firm—Parkhurst & Oliff

[57] ABSTRACT

A wire cutting type electrical discharge machining system for removing metal by utilizing of an electrical discharge energy between an electrically conductive workpiece and a wire electrode which is continuously fed lengthwise relative to the workpiece, including a frame, a wire guide conduit, and a flexible tube inserted in the wire guide conduit. The wire guide conduit is disposed fixedly with respect to the frame, so that the wire electrode is passed through the conduit. The flexible tube is axially slidably moved in the wire guide conduit in a telescopic fashion such that an outer end of the flexible tube is movable outwardly away from a corresponding end of the wire guide conduit, to an access position at which one end of the wire electrode may be easily inserted into the flexible tube through the outer end thereof and guided by the flexible tube into the wire guide conduit.

6 Claims, 4 Drawing Figures

APPARATUS FOR INSERTION OF ELECTRODE WIRE IN THE WIRE CONDUIT OF A LOWER ARM

BACKGROUND OF THE INVENTION

The present invention relates generally to a wire cutting type electrical discharge machining system for machining an electrically conductive workpiece by means of an electrical discharge energy which is generated between a continuously fed wire electrode and the workpiece. More particularly, this invention relates to a movable flexible tube for easy insertion of the wire electrode into a wire passage.

In a traditional electrical discharge machining system, an electrode in the form of a wire is guided by wire guides along a predetermined path which is formed outside the machine frame. For better appearance of the machine and improved safety, a wire passage defining the wire path except its portion in the vicinity of the workpiece is preferably formed within the machine frame. In this case, it is difficult and troublesome to thread or insert the wire electrode through or into the wire passage. For example, a lower wire passage is formed within a lower arm which extends laterally from the column of the machine. The lower arm carries at its outer free end a lower wire guide which cooperates with an upper wire guide to guide the wire electrode so that the wire electrode runs across the workpiece positioned between the upper and lower guides. Therefore, the free end of the lower arm and consequently the lower wire guide are located below the workpiece. In this arrangement, it is a very hard job to insert the wire electrode into the wire passage through its outer end located below the lower wire guide which is located below the workpiece. Such insertion of the wire electrode is required when the wire electrode is initially threaded through the machinig system, or when it is cut off during a machining operation. This difficulty in inserting the wire electrode stems from the geometrical arrangement wherein the workpiece and the lower wire guide prevent an easy access to the inlet of the wire passage.

SUMMARY OF THE INVENTION

It is, accordingly, an object of the invention to provide an improved wire cutting type electrical discharge machining system having a wire guiding device, wherein a wire electrode is easily inserted into a wire passage formed within a machine frame, at the beginning of the machining or during the machining operation.

According to the present invention, there is provided a wire cutting type electrical discharge machining system for removing metal by means of an electrical discharge energy between a workpiece and a wire electrode which is continuously fed lengthwise relative to the workpiece, comprising: (a) a frame having a wire passage through which said wire electrode is passed; and (b) a flexible tube inserted in the wire passage axially movably such that an outer end of the flexible tube is movable outwardly away from a corresponding end of the wire passage, to an access position at which one end of the wire electrode may be easily inserted into the flexible tube through the outer end thereof and guided by the flexible tube into the wire passage.

In the electrical discharge machining system of the invention constructed as described above, the wire electrode can be easily inserted into the wire passage because the flexible tube is disposed in the wire passage and is movable therein outwards away from the frame to an access position at which one end of the wire electrode is easily inserted into the flexible tube through its outer end thereof and guided by the flexible tube into the wire passage.

In order that the flexible tube may be easily bent or curved, for example, along the lower wire guide roller, the flexible tube is made of a flexible material, preferably a suitable synthetic resin that gives the flexible tube a relatively low coefficient of friction and a relatively low level property of permitting adhesion of metal particles, as well as high flexibility. In this respect, it is preferred to use polytetrafluoroethylene, preferably containing glass fiber.

According to one embodiment of the invention, the frame has a wire guide conduit fixed thereto. This wire guide conduit has a bore serving as the wire passage. In this case, the flexible tube is slidably movable in the wire passage telescopically with respect to the wire guide conduit.

In one form of the above embodiment, the electrical discharge machining system further comprises a lower arm of elongate tubular shape extending laterally from the frame such that a free end thereof is located below the workpiece. In this case, the wire guide conduit extends within the lower arm along the length of the lower arm.

In the above form of the invention, the lower arm may carry at its free end a lower electrode guide for guiding the wire electrode. In this instance, the outer end of the wire guide conduit is located adjacent to and below the lower electrode guide, and the corresponding outer end of the flexible tube is movable along a path under the lower electrode guide to its access position when the wire electrode is guided into the wire guide conduit.

The lower arm may further carry at its free end an annular guide block for guiding and positioning the wire electrode, and a bracket for retaining the annular guide block. The annular guide block is located adjacent to and above the lower electrode guide.

As is apparent from the above description, the utility of the flexible tube in the wire passage according to the invention is increased as the number of parts around the outer end of the wire passage is increased.

BRIEF DESCRIPTION OF THE DRAWING

The aforementioned object and features of the invention as well as advantages thereof will become more readily apparent from the following description taken with reference to the accompanying drawing in which.

DETAILED DESCRIPTION OF THE PREFERRED EMBODIMENT

Figure 1:
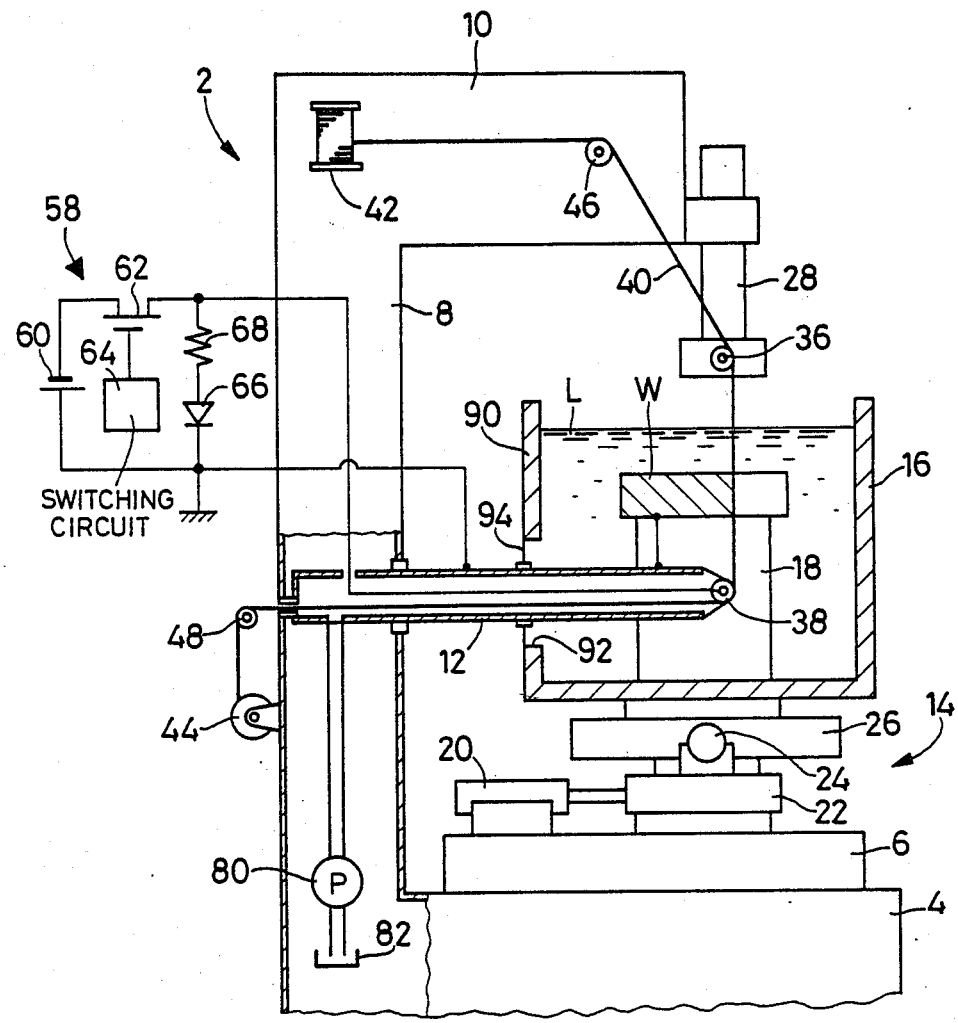
FIG. 1 is a schematic view partly in cross section of a wire cutting type electrical discharge machining system embodying the present invention.

A wire cutting type electrical discharge machining system according to the invention is provided with a frame 2, as clearly seen in FIG. 1, which frame 2 includes a base 4, a bed 6 mounted thereupon, a column 8 which is erected on top of one end portion of the bed 6, an upper arm 10 extending horizontally from the upper end of the column 8 rightward (FIG. 1), and a lower arm 12 extending in parallel with the upper arm 10 from the middle portion of the column 8. On the bed 6 there is disposed a work pan 16 filled with a machining fluid therein, by way of an X-Y feed device 14, movably in a horizontal plane. On the bottom wall of the work pan 16 a table 18 for supporting an electrically conductive workpiece W is disposed. The above-mentioned X-Y feed device 14 is provided with a Y-slide 22 mounted on the bed 6 movably in Y-axis direction, i.e., leftward and rightward directions in the horizontal plane, by the action of a Y-feed motor 20, and with an X-slide 26 mounted on the Y-slide 22 movably in X-axis direction perpendicular to the Y-axis, i.e., forward and backward directions, by the action of an X-feed motor 24. The workpiece W can be, due to the combined operation of the Y-slide 22 and the X-slide 26, fed in any desired direction in the horizontal plane.

The upper arm 10 is provided, at the free end thereof just above the work pan 16, with a height adjustable head 28 having on the lower end thereof an upper electrode guide 36. The lower arm 12 extends passing through one side wall 90 of the work pan 16 as far as a position just beneath the workpiece W. The lower arm 12 is a tubular member, made of an electrically conductive material, and fixed at its root portion on to the column 8 in an electrically insulated state with respect to the column 8. On the tip of the lower arm 12 a lower electrode guide 38 having an electrically conductive roller is mounted in an electrically insulated state.

On the upper portion of the column 8 a wire supply device 42 is disposed for supplying a wire electrode 40 in the form of a metallic wire. On the lower portion of the column 8 is disposed a wire take-up device 44 for winding up the wire electrode 40. The wire electrode 40 fed from the wire supply device 42 and guided by a guide roller 46 and the upper electrode guide 36, is continuously delivered through the machining space or gap in the work pan 16. The already used portion of the wire electrode 40 is recovered or collected by the wire take-up device 44 by way of the lower electrode guide 38 and a guide roller 48.

To the wire electrode 40 and the workpiece W a power circuit 58 is connected for repeatedly generating pulse discharge between the two (40. W). The then produced discharge energy is used for the machining of the workpiece W. Speaking more specifically, to one terminal of a DC power supply 60 is connected a source terminal of a field-effect transistor 62; to the gate terminal thereof is connected a switching circuit 64 for controlling the switching operation of the transistor 62. Between the drain terminal of the transistor 62 and the other terminal of the DC power supply 60 a diode 66 and a resistor 68 are connected for erasing the reactance generated by the switching operation of the transistor 62. The workpiece W is connected via the electrically conductive lower arm 12 to a grounding terminal of the power circuit 58; and the wire electrode 40 is on the other hand connected to the other terminal of the power circuit 58 by way of the lower electrode guide 38.

A pump 80 is disposed in fluid communication with the lower arm 12. With the operation of the pump 80, the machining fluid L is pumped from a tank 82 and delivered to the lower arm 12 so as to fill up the work pan 16 at the beginning of the machining, and as to flush away metal particles in the machining gap between the wire electrode 40 and the workpiece W during the machining operation.

A fluid sealing between the side wall 90 of the work pan 16 and the lower arm 12 extending through the former is maintained by a sealing structure which will be described below.

In a relatively lower portion of the side wall 90 of the work pan 16 an elongate aperture 92 is formed in a substantially horizontal direction, so that the lower arm 12 extends through the aperture 92 into the work pan 16.

The elongate aperture 92 is closed by a closure strip 94 made of a flexible and resilient material such as a stainless spring steel, which is capable of taking a suitably wound form to enable the opposite end portions thereof to be wound by their own resiliency on a pair of reels (not shown) supported at the ends of the side walls 90.

The internal structure of the lower arm 12 will be described with reference to FIGS. 2, 3 and 4.

Figure 2:
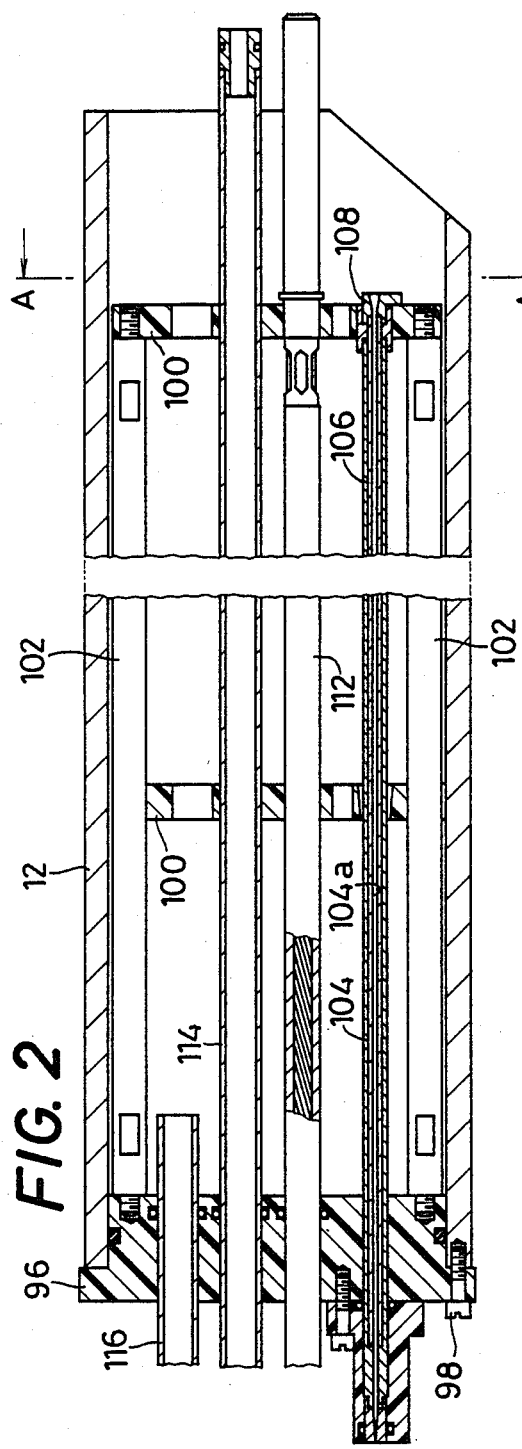
FIG. 2 is a fragmentary enlarged cross sectional view of a lower arm of the machining system of FIG. 1, showing in longitudinal cross section several conduits running inside the lower arm.
Figure 3:
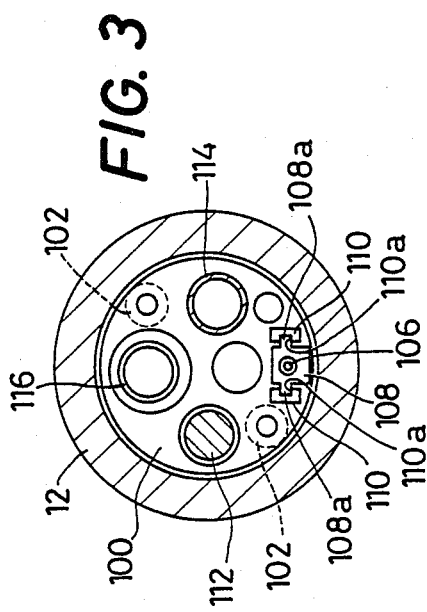
FIG. 3 is a cross section in enlargement taken along the line A—A in FIG. 2.

The lower arm 12 constituted by an electrically conductive tubular member has, at the fixed or innermost end thereof, an end plate 96, and a plurality of support plates 100 made of a non-conductive material arranged inside the tube of the arm 12 with predetermined longitudinal spacings, as clearly shown in FIG. 2. Between the end plate 96 and the outermost support plate 100 a plurality of support rods 102 are spanned for fixing the end plate 96 and support plates 100 together. A longitudinally extending wire guide conduit 104 is retained, at the bottom position within the lower arm 12, in such a manner as to extends through the end plate 96 and the support plates 100. The wire guide conduit 104 has an elongate bore 104a serving as a wire passage through which a flexible tube 106 is inserted. The wire electrode 40 is passed through the flexible tube 106. This flexible tube 106 is axially slidable in the elongate bore 104a in a telescopic fashion such that an outer end 106a of the flexible tube 106 is movable outwards away from a corresponding end of the wire guide conduit 104. In this way, the outer end 106a is movable from its normal position adjacent to the above-indicated end of the conduit 104, to its access position at which one end of the wire electrode 40 may be easily inserted into the flexible tube 106 through the opening at the outer end 106a thereof and guided by the flexible tube 106 into the wire guide conduit 104, as indicated in FIG. 4. Obviously, the inner end of the flexible tube 106 in this condition is located within the wire guide conduit 104. In order that the flexible tube 106 may be easily bent or curved, for example, along the lower wire guide roller 38, the flexible tube 106 is made of a flexible material, preferably a suitable synthetic resin that gives the flexible tube 106 a relatively low coefficient of friction and a relatively low level property of permitting adhesion of metal particles, as well as high flexibility. In this respect, it is preferred to use polytetrafluoroethylene, preferably containing glass fiber. A terminal ring 108 with a pair of projections 108a is fixed to the outer end 106a as seen in FIG. 3. The projections 108a are engageable with a pair of parallel slots 110a formed in opposed holder pieces 110 supported by the outermost support plate 100. When the flexible tube 106 is wholly inserted in the wire guide conduit 104 with its outer end placed in its normal position, the projections 108a are fitted in the slots 110a. In the lower arm 12 a power cable 112 is also installed, being supported by the end plate 96 and the support plates 100, for supplying power to the wire electrode 40.

In the lower arm 12 a fluid supply conduit 114 is also disposed, being supported by the end plate 96 and the support plates 100 in such a manner as to extend therethrough, to feed the machining fluid L, during the machining operation, into the machining gap between the wire electrode 40 and the workpiece W, for the purpose of flushing away metal particles produced in the gap. A fluid pipe 116 is retained by the end plate 96, while passing the same, at an upper position within the lower arm 12. The end of the fluid pipe 116 is open in the lower arm 12, to supply the machining fluid L via a passage in the lower arm 12 so as to fill the work pan 16 with the fluid L, at the beginning of a machining operation.

Figure 4:
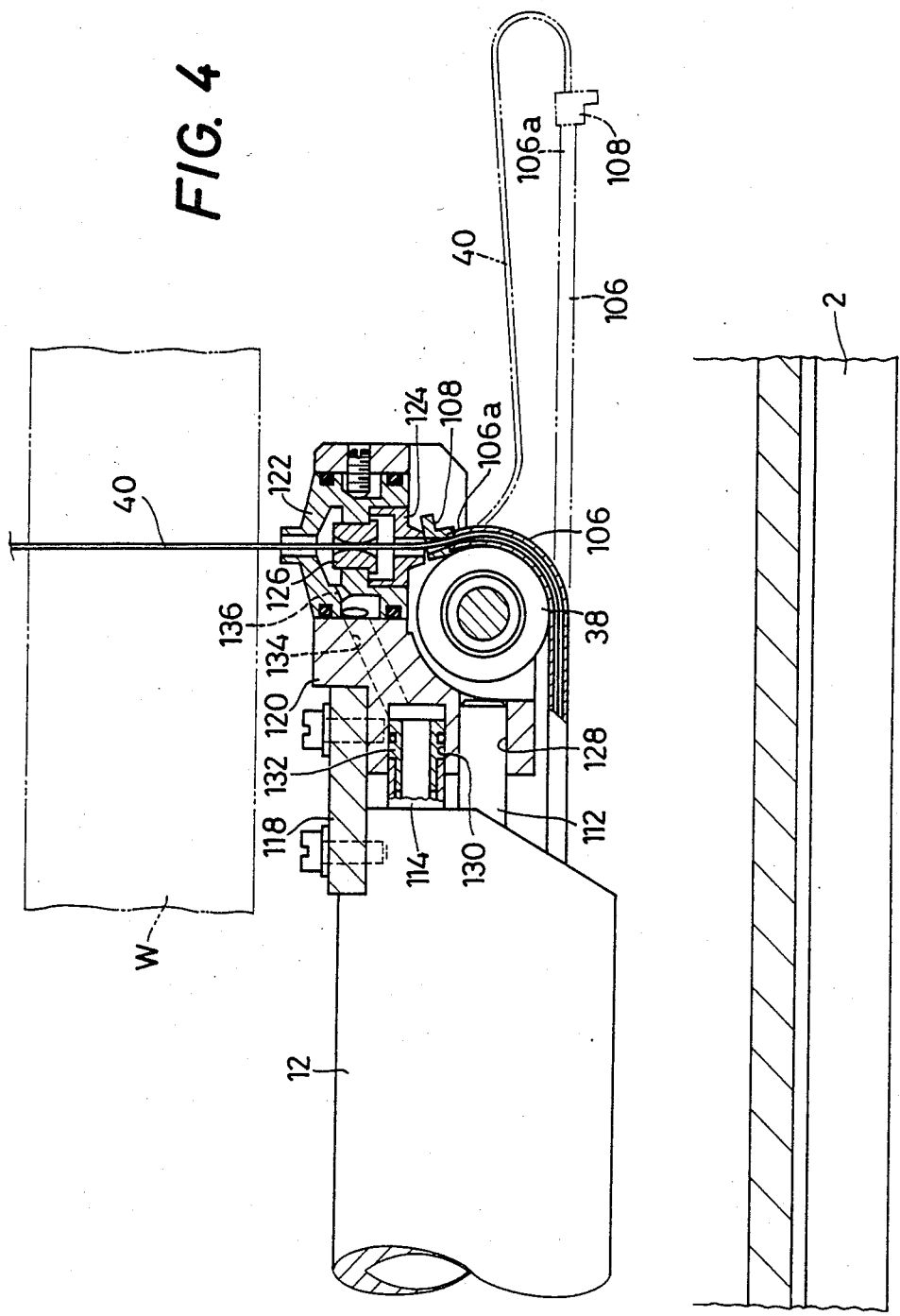
FIG. 4 is an inner view partly in cross section illustrating the structure of the free end portion of the lower arm.

On the outermost end of the lower arm 12 an electrically conductive bracket 120 is attached, as seen in FIG. 4, via an electrically insulating plate 118. At the end of the bracket 120 is a rotatably mounted roller of the lower electrode guide 38 for positioning as well as guiding the wire electrode 40.

A pair of uppe and lower cylindrical members 122, 124, with a built-in guide member 126 for guiding the wire electrode 40, are mounted on the bracket 120. In the bracket 120 a bore 128 is formed, in which the outer end of the power cable 112 is inserted. Power is supplied, through the power cable in the power cable 112 to the wire electrode 40 via the bracket 120 and the lower electrode guide 38. In the bracket 120 is formed a receptacle 130 to which the outer end of the fluid supply conduit 114 is connected by way of a coupling 132. The machining fluid L for flushing away the metal particles in the machining gap is supplied from the fluid supply conduit 114 via passages 134, 136 in the bracket 120 and via the aforementioned upper cylindrical member 122 functioning as a nozzle.

It will be described how the wire electrode 40 can be easily inserted into the elongate bore 104a when the wire electrode 40 is initially threaded through the machining system at the beginning of the machining or when the wire electrode 40 is cut off during the machining operation and the one cut-off end of the wire electrode 40 is inserted into the wire guide conduit 104.

In either case, the terminal ring 108 is gripped and pulled out away from the holder pieces 110. As a result, the flexible tube 106 whose outer end 106a is located at its normal position and secured in the terminal ring 108, is slid outwardly in the elongate bore 104a. As shown in FIG. 4, the terminal ring 108 and the flexible tube 106 are pulled along the lower electrode guide roller 38 so that the outer end 106a is positioned at its access position under the lower cylindrical member 124, so that the terminal ring 108 is aligned with the wire path which is defined in the upper and lower cylindrical members 122, 124 and in the guide member 126.

In this condition, the leading end portion of the wire electrode 40, which extends through the machining gap in the workpiece W and through the above-indicated wire path, is easily inserted into the outer end 106a of the flexible tube 106 via the terminal ring 108. In this way, the wire electrode 40 can be easily run through the elongate bore 104a while being guided by the flexible tube 106, which is then slid back into the elongate bore 104a.

In the case that the workpiece W is large in size enough to prevent the operation described above, both the leading end of the wire electrode 40 and the outer end 106a of the flexible tube 106 must be positioned away from the lower arm 12 to a position where the insertion of the wire electrode 40 into the flexible tube 106 can be easily done. The wire electrode 40 is first inserted through the workpiece W, cylindrical members 122, 124 and guide member 126. Then, the wire electrode 40 is pulled to the position indicated in two-dot chain lines in FIG. 4. The flexible tube 106 is also pulled out to the access position indicated in two-dot chain lines. At this position, it is easy to insert the wire electrode 40 into the flexible tube 106. Then, the wire electrode 40, guided with the flexible tube 106, can be easily fed through the elongate bore 104a.

It will be obvious to those skilled in the art that various changes may be made without departing from the scope of the invention and the invention is not to be considered limited to the illustrated embodiment shown in the drawings and described in the specification.

What is claimed is:

1. A wire cutting type electrical discharge machining system for removing metal by means of an electrical discharge energy between an electrically conductive workpiece and a wire electrode continuously fed lengthwise relative to the workpiece, comprising:
   a wire electrode;
   a frame having a wire guide conduit fixed thereto such that the wire electrode is passed through said wire guide conduit; and
   a flexible tube inserted in said wire guide conduit and axially movable slidably in said wire guide conduit in a telescopic fashion such that an outer end of said flexible tube is movable between a normal position adjacent to a corresponding end of said wire guide conduit, and an access position outwardly away from said normal position, an inner end of said flexible tube being located within said wire guide conduit when said outer end of said flexible tube is located at said access position where one end of the wire electrode is inserted easily into said outer end of said flexible tube and guided by said flexible tube into said wire guide conduit.

2. The electrical discharge machining system of claim 1, wherein said flexible tube is made of synthetic resin.

3. The electrical discharge machinig system of claim 2, wherein said flexible tube is made of polytetrafluoroethylene containing glass fiber.

4. The electrical discharge machining system of claim 1, further comprising an elongated tubular shaped lower arm extending laterally from said frame such that a free end thereof is located below the electrically conductive workpiece, said wire guide conduit extending within the length of said lower arm.

5. The electrical discharge machining system of claim 4, wherein said lower arm carries a lower electrode guide at the free end for guiding said wire electrode, said corresponding end of said wire guide conduit being located adjacent to and below said lower electrode guide, said outer end of said flexible tube being movable along a path under said lower electrode guide to said access position when said wire electrode is inserted into said wire guide conduit.

6. The electrical discharge machining system of claim 5, wherein said lower arm further comprises an annular guide block carried at said free end for guiding and positioning said wire electrode, and a bracket for retaining said annular guide block, said annular guide block being located adjacent to and above said lower electrode guide.

* * * * *